(12) United States Patent  
Mueller

(10) Patent No.: US 9,419,404 B1  
(45) Date of Patent: Aug. 16, 2016

(54) WATER-COOLED CARBON-DIOXIDE LASER

(71) Applicant: Coherent, Inc., Santa Clara, CA (US)

(72) Inventor: Eric R. Mueller, West Suffield, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/693,704

(22) Filed: Apr. 22, 2015

(51) Int. Cl.
| | |
|---|---|
| H01S 3/04 | (2006.01) |
| H01S 3/041 | (2006.01) |
| H01S 3/223 | (2006.01) |
| H01S 3/097 | (2006.01) |
| H01S 3/03 | (2006.01) |

(52) U.S. Cl.
CPC ............. *H01S 3/0407* (2013.01); *H01S 3/0315* (2013.01); *H01S 3/041* (2013.01); *H01S 3/09702* (2013.01); *H01S 3/2232* (2013.01)

(58) Field of Classification Search
CPC ..... H01S 3/0407; H01S 3/0315; H01S 3/041; H01S 3/2232
See application file for complete search history.

(56) References Cited

U.S. PATENT DOCUMENTS

| | | |
|---|---|---|
| 6,788,722 B1 | 9/2004 | Kennedy et al. |
| 8,731,015 B2 | 5/2014 | Newman et al. |
| 2002/0097767 A1* | 7/2002 | Krasnov ............... H01S 3/0975 372/55 |
| 2002/0167976 A1 | 11/2002 | Seguin et al. |
| 2012/0281728 A1 | 11/2012 | Demaria et al. |
| 2013/0259074 A1 | 10/2013 | Newman et al. |

OTHER PUBLICATIONS

International Search Report and Written Opinion received for PCT Patent Application No. PCT/US2016/024768, mailed on Jun. 16, 2016, 15 pages.

* cited by examiner

*Primary Examiner* — Dung Nguyen  
(74) *Attorney, Agent, or Firm* — Morrison & Foerster LLP

(57) ABSTRACT

A carbon dioxide waveguide-laser includes an elongated resonator compartment and an elongated power supply compartment. The resonator and power-supply compartments are separated by a water-cooled heat sink.

13 Claims, 6 Drawing Sheets

US 9,419,404 B1

WATER-COOLED CARBON-DIOXIDE LASER

TECHNICAL FIELD OF THE INVENTION

The present invention relates in general to carbon-dioxide ($CO_2$) lasers energized by a radio-frequency (RF) discharge. The invention relates in particular to cooling arrangements for such lasers.

DISCUSSION OF BACKGROUND ART

Waveguide $CO_2$ lasers are used in several precision laser machining operations, in particular, hole drilling in various substrate materials. In such an operation, the laser is operated in a pulsed manner with an output beam of the laser steered by galvanometer mirrors to locations on a substrate where holes are to be drilled.

A problem with all such lasers is that during a warm-up period after the laser is turned on following a quiescent period, the output-beam direction, referred to as "pointing" by practitioners of the art changes progressively. This is due to rising of the temperature of the laser, and the complex mechanical and electrical design and construction of the laser. This pointing-change adversely affects steering of the beam by the galvanometers mirrors, sometimes to a point where, hole-drilling cannot be carried out with a required precision.

The laser temperature, and accordingly the beam pointing, stabilizes after a certain time period, for example five minutes, making the galvanometer steering reproducible, as long as the laser remains turned on. This stabilization period, however, represents a period of lost production in the hole-drilling operation. There is a need for a design and construction of a $CO_2$ waveguide laser which can reduce if not altogether eliminate the pointing-stabilization period.

SUMMARY OF THE INVENTION

In one aspect, laser apparatus in accordance with the present invention comprises an elongated, gas filled resonator compartment including a laser-resonator unit and an elongated radio-frequency (RF) power supply compartment including a RF power-supply for energizing gas in the resonator unit. The resonator and power supply compartments are aligned parallel to each other and spatially separated by an elongated water-cooled heat-sink. The resonator and power supply units are in thermal communication with the water-cooled heat sink.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
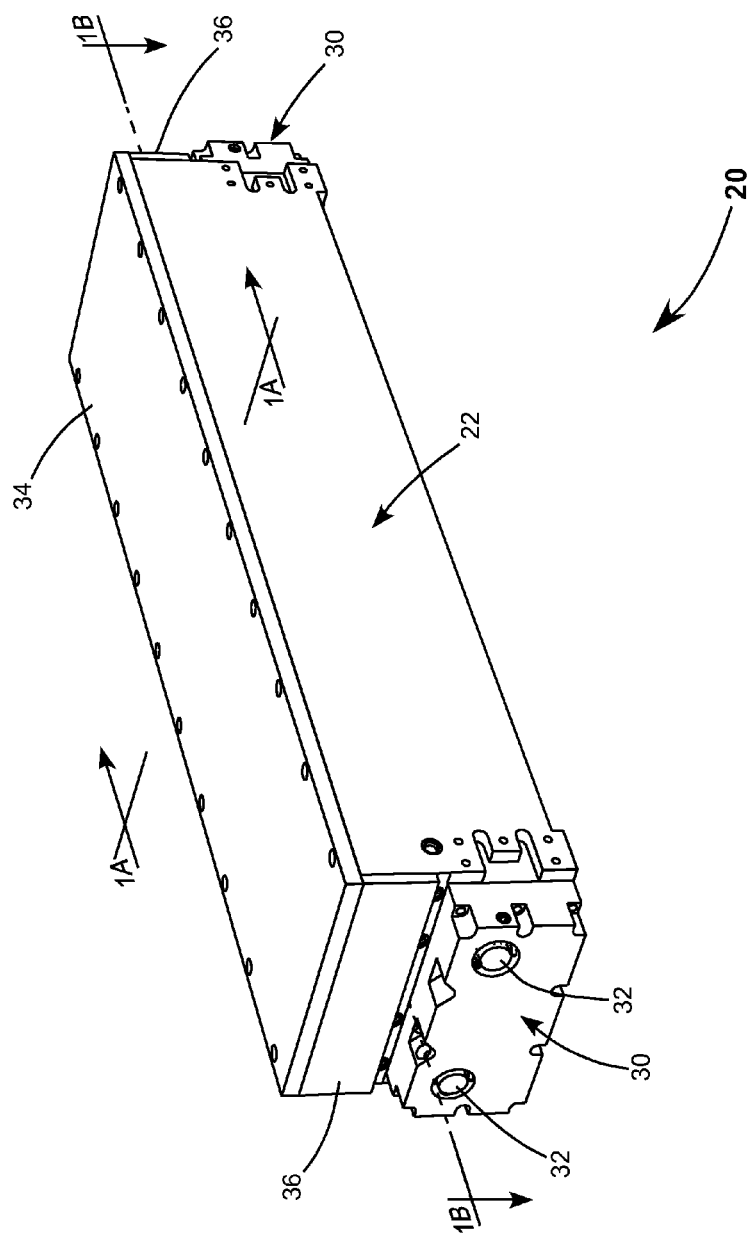
FIG. 1 is a perspective view schematically illustrating one preferred embodiment of $CO_2$ waveguide-laser apparatus in accordance with the present invention, including elongated resonator compartment and an elongated power-supply compartment spaced apart by a water-cooled heat-sink.
Figure 1A:
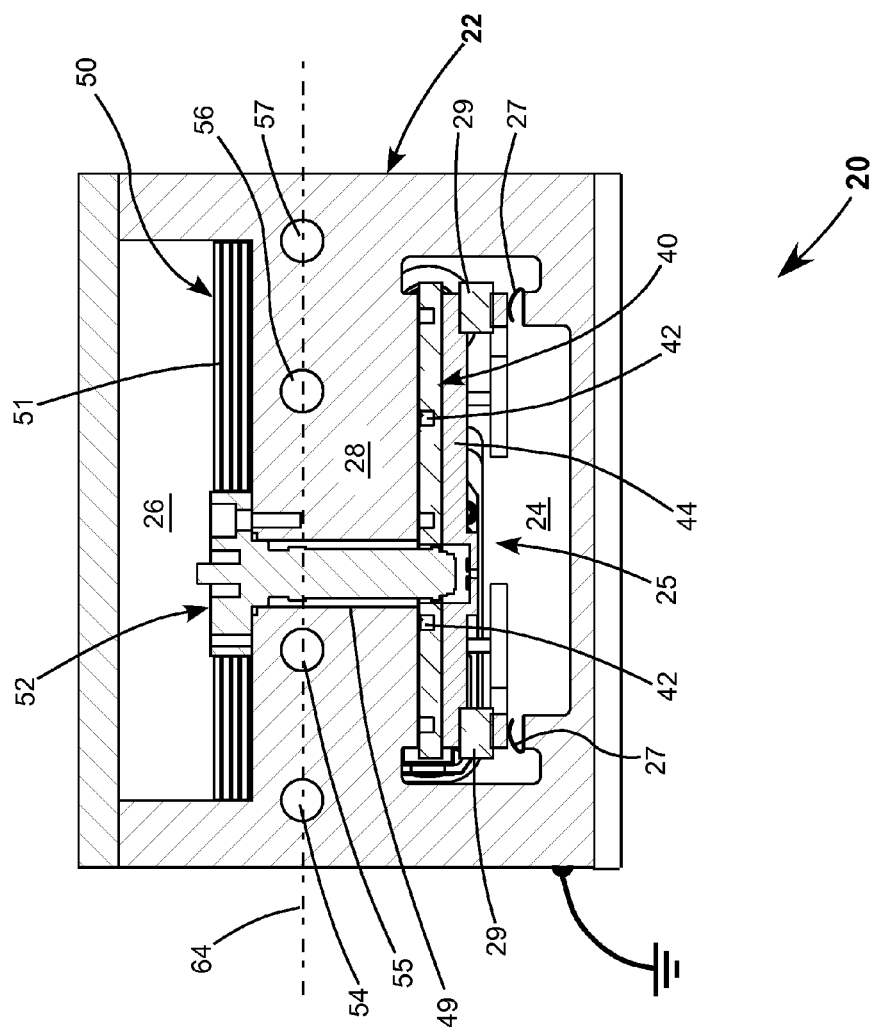
FIG. 1A is a lateral cross-section view seen generally in the direction 1A-1A of FIG. 1, schematically illustrating details of the resonator compartment, power-supply compartment, and heat-sink of the laser of FIG. 1 including integral cooling channels.
Figure 1B:
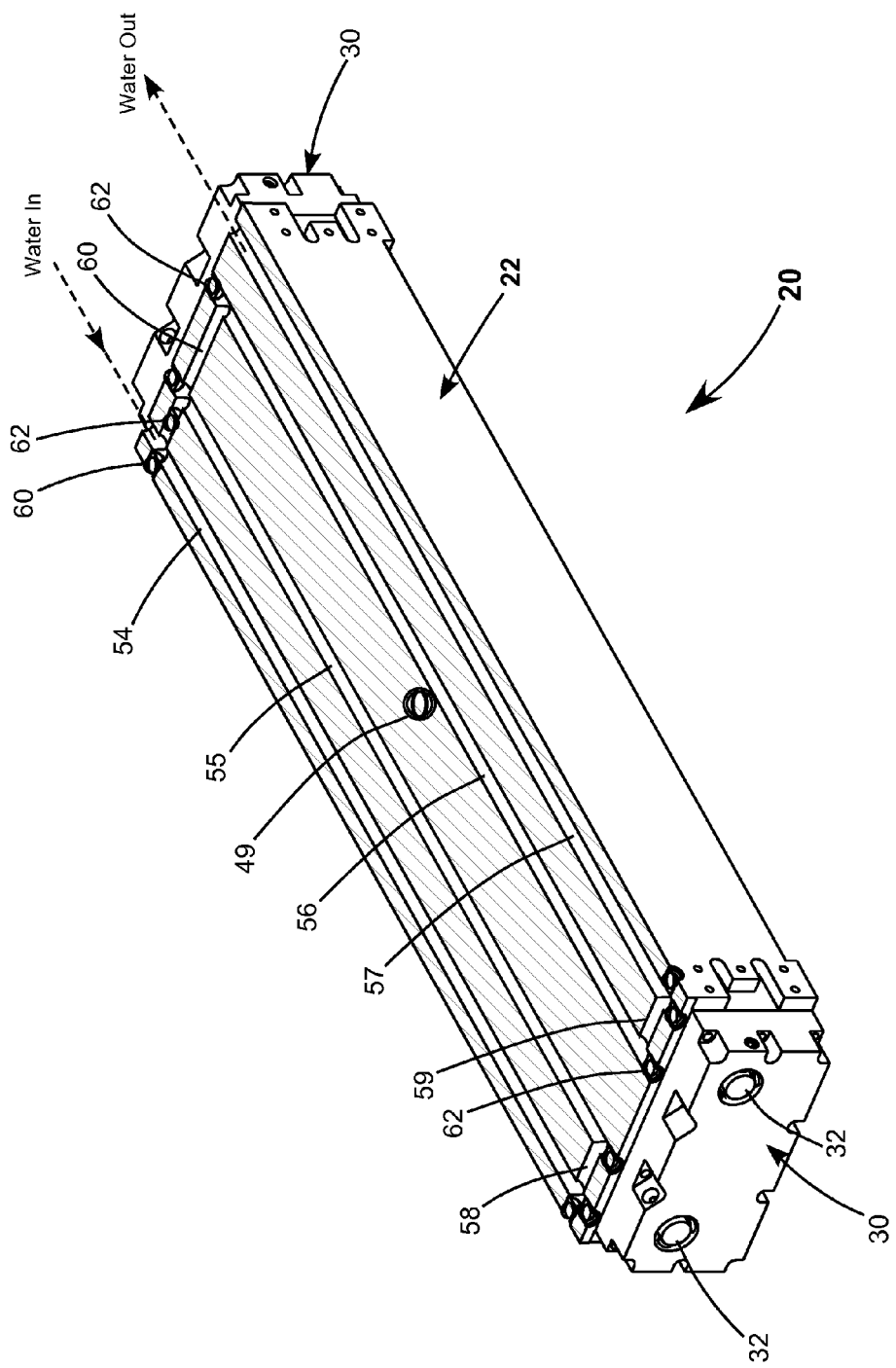
FIG. 1B is a longitudinal cross-section perspective view schematically illustrating further details of the integral cooling channels in the heat-sink of FIG. 1A.

Turning now to the drawings, wherein like features are designated by like reference numerals, FIG. 1, FIG. 1A, and FIG. 1B schematically illustrate one preferred embodiment 20 of $CO_2$ waveguide-laser apparatus in accordance with the present invention. In an elongated aluminum extrusion 22 are defined an elongated resonator compartment 24 and an elongated a power-supply compartment 26. The resonator and power-supply compartments are separated by a heat sink 28 which is an integral part of extrusion 22.

In power-supply compartment 26 is a RF power supply 50 having electrical components (not shown) mounted on a printed circuit board (PCB) 51. PCB 51 is supported on heat sink 28 in thermal communication therewith. In resonator compartment 24 is a resonator unit 25 including a ceramic plate 40, in which waveguide channels 42 are machined. Resonator compartment 24 is hermetically sealed by end plates 30 in which resonator mirrors 32 are mounted. The resonator mirrors define a "folded" resonator having a resonator axis extending through the waveguide-channels. The resonator compartment contains a lasing gas mixture including carbon dioxide. Power supply compartment 26 is enclosed by a top plate 34 and end plates 36 (see FIG. 1).

Ceramic plate 40 of resonator unit 25 is backed by a "live" electrode plate 44. The resonator unit is held in thermal contact with heat sink 28 by springs 27. Live electrode plate 44 is electrically isolated from extrusion 22 by ceramic plate 40 and ceramic spacers 29. Extrusion 22 and accordingly heat sink 28 is electrically grounded. RF power from power-supply 50 is supplied to electrode plate by an insulated feedthrough 52 extending vertically through the heat-sink via an aperture 49 therein. When RF power is supplied to live-electrode plate 44 a discharge is struck and sustained in lasing gas in waveguide channels 44 for energizing the laser-resonator.

It is pointed out here that only sufficient details of resonator unit of the laser-resonator of laser 20 are described and depicted for understanding principles of the present invention. Details of $CO_2$ folded-resonator waveguide-lasers are well known in the art. A detailed description of folded-resonator $CO_2$ waveguide-lasers in several folding configurations is provided in U.S. Pat. No. 6,788,722, assigned to the assignee of the present invention, and the complete disclosure of which is hereby incorporated herein by reference.

Referring in particular to FIGS. 1A and 1B, heat sink 28 is cooled by water flowing through a plurality of longitudinally-extending channels formed by drilling through heat-sink 28 from one end thereof to the other. Here, there are four such channels, designated by reference numerals 54, 55, 56 and 57.

Referring specifically to FIG. 1B, a fluid connection between channels 54 and 55 is provided by a lateral channel 58 drilled into heat sink 28 from one side edge thereof. A fluid connection between channels 56 and 57 is provided by a lateral channel 59 drilled into heat sink 28 from an opposite side edge thereof. A lateral channel 60 drilled into the heat-sink from the same side edge thereof as channel 58 provides a fluid connection between channels 55 and 56. The lateral channels 58 and 59 run along on end of the heat sink while channel 60 runs along the oppose end. A plurality of plugs 62 inserted into the lateral and longitudinal channels are arranged such that water introduced into channel 54 flows in a serpentine fashion through channels 54, 55, 56, and 57 in sequence and exits the heat-sink via channel 57.

Referring again to FIG. 1A, the above-described cooling-water channels are in a plane 64, parallel to the power-supply and resonator compartments, and which is preferably positioned in the heat-sink such that, in start-up and operation of laser 20 any tendency for longitudinal bowing of the laser due to differential expansion is minimized if not altogether completely eliminated. This can be referred to as a thermo-mechanically neutral condition of the laser. In general, the plane 64 will be closer to the power-supply compartment than to the resonator compartment reflecting a fact that more heat is generated by the power-supply than the resonator unit.

The laser depicted in FIG. 1 and FIG. 1A is representative of a $CO_2$ waveguide laser having an output of 35 Watts (W) driven by an RF power-supply having an output power of 350 W. Such a laser would have a length of about 30 centimeters (cm), width of about 9 cm, and a height of about 7 cm. Heat sink 28 has a thickness of about 2.2 cm. Plane 64 is located at about 0.6 cm from PCB 51 for achieving the thermo-mechanical neutral condition.

It is emphasized here that these above-specified dimensions are merely exemplary. Those skilled in the art, from the description presented herein, may select other dimensions for the same or different laser power and resonator configuration without departing from the spirit and scope of the present invention. Thermal and mechanical properties of such structures can be investigated using mechanical design software, such as SOLIDWORKS available from Dassault Systèmes Inc. of Waltham, Mass.

It should be noted here that while the present invention is described above as incorporating a folded-resonator waveguide $CO_2$ laser with an operating mode guided in two mutually perpendicular transverse directions by a plurality of waveguide channels, principles of the invention are equally applicable to a resonator including a single wide waveguide channel guiding a mode in only one transverse direction. In such a laser, an unstable resonator would be selected to guide the mode in a zig-zag path in a plane perpendicular to the waveguide direction. Such a laser is typically referred to by practitioners of the art as a slab $CO_2$ laser. One such laser is described in detail in U.S. Pat. No. 8,731,015, assigned to the assignee of the present invention, and the complete disclosure of which is hereby incorporated herein by reference.

Figure 2:
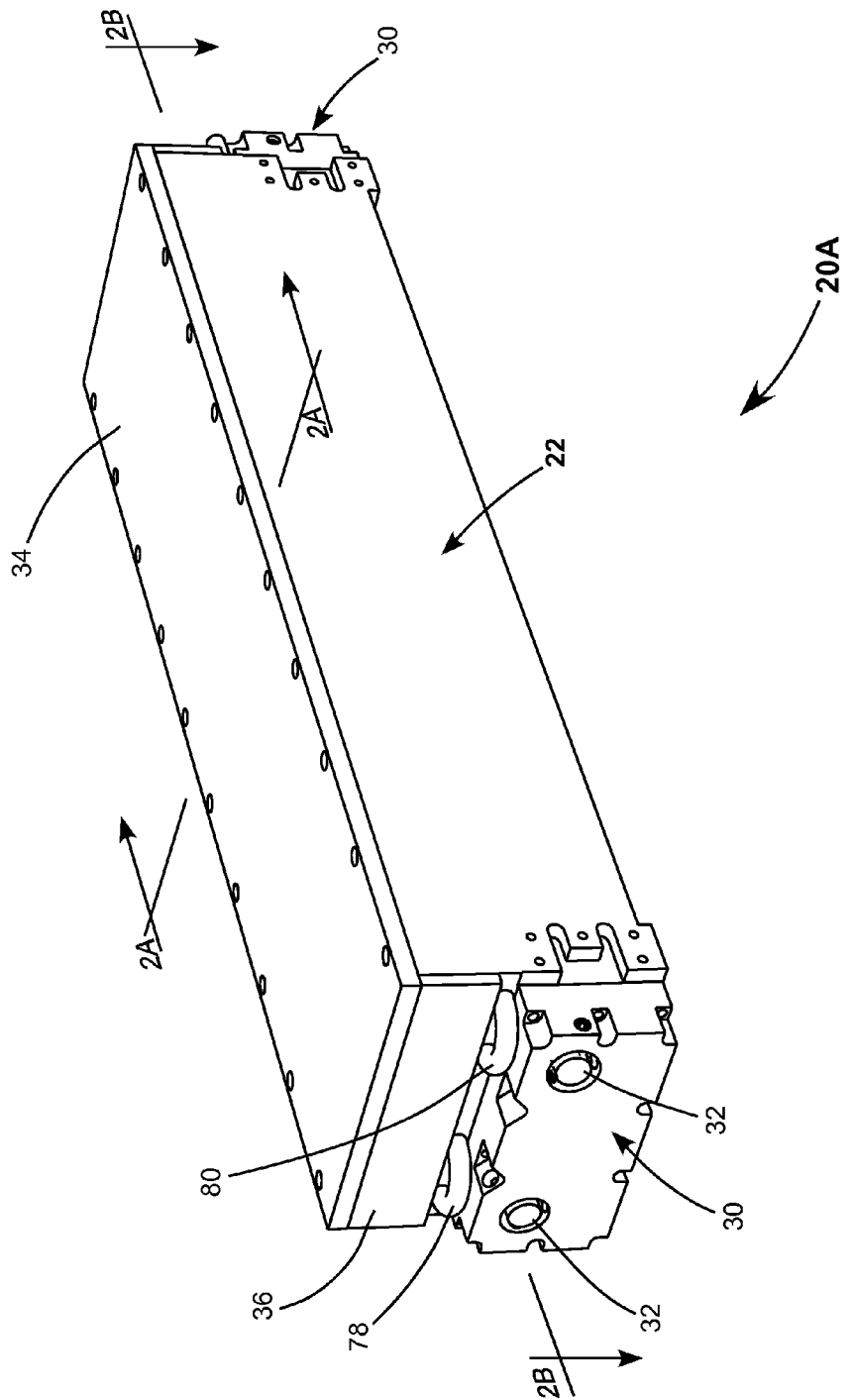
FIG. 2 is a perspective view schematically illustrating another preferred embodiment of $CO_2$ waveguide-laser apparatus in accordance with the present invention, similar to the laser of FIG. 1, but wherein the integral cooling channels of the heat-sink are replaced by a serpentine cooling-conduit.
Figure 2A:
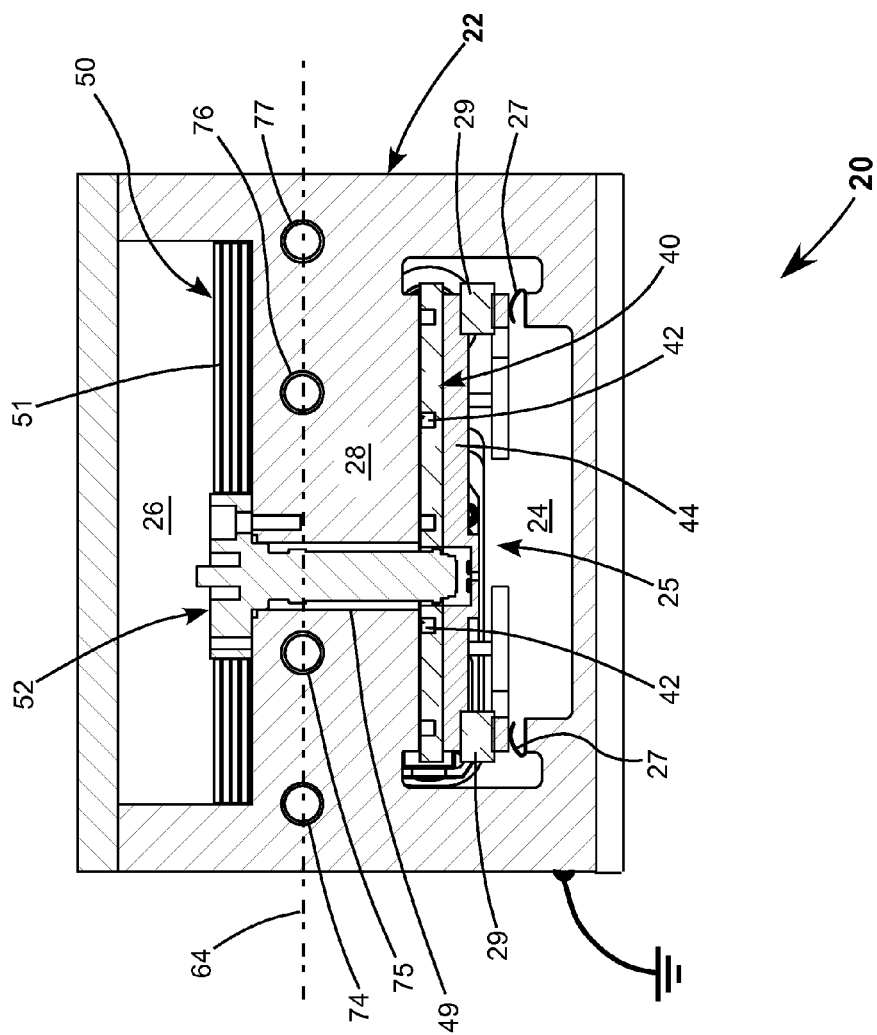
FIG. 2A is a lateral cross-section view seen generally in the direction 2A-2A of FIG. 2, schematically illustrating details of the cooling conduit of the laser of FIG. 2
Figure 2B:
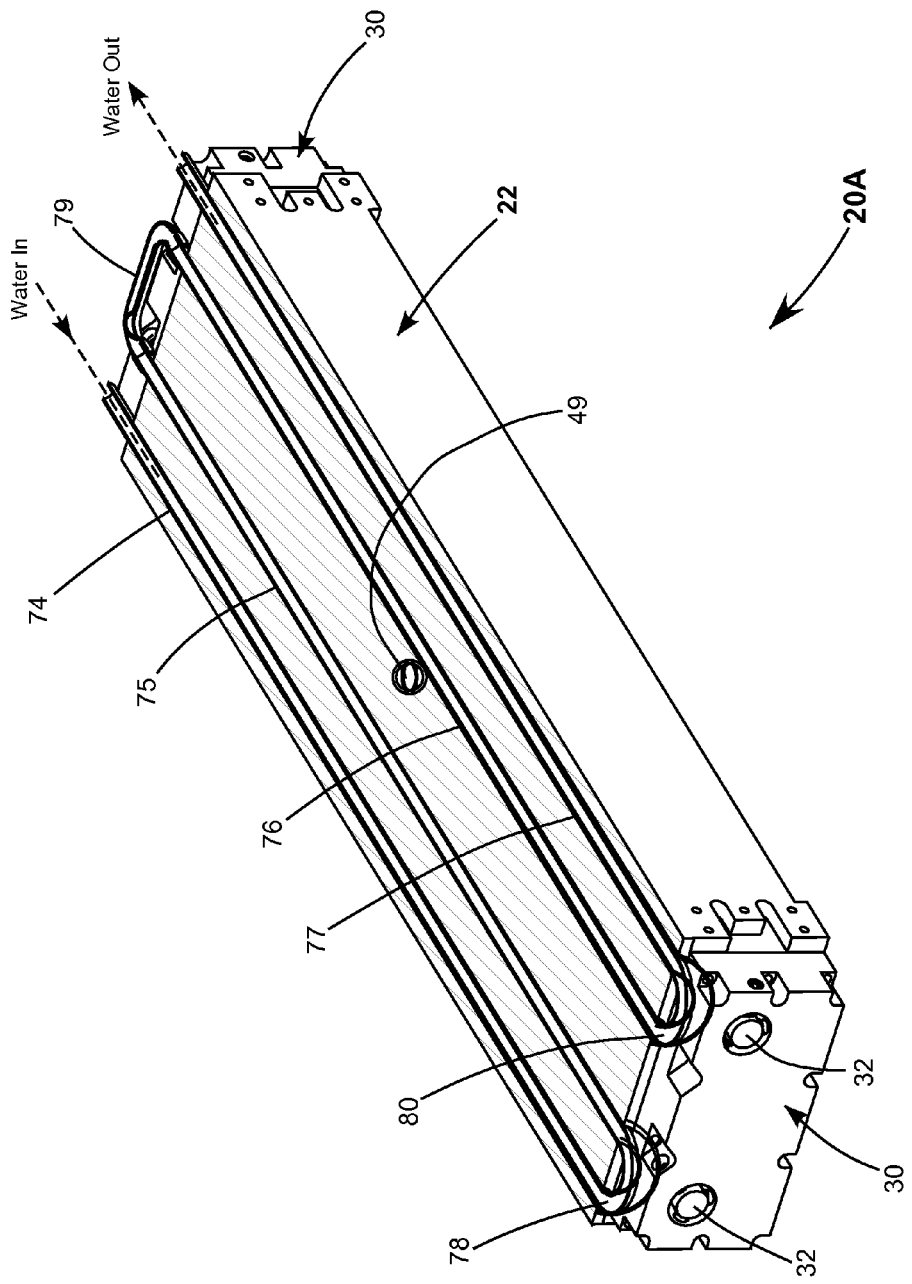
FIG. 2B is a perspective cross-section view seen generally in the direction 2B-2B of FIG. 2, schematically illustrating further details of the cooling conduit of FIG. 2.

FIG. 2, FIG. 2A, and FIG. 2B schematically illustrate another preferred embodiment 20A of $CO_2$ waveguide-laser apparatus in accordance with the present invention. Laser 20A is similar to laser 20 of FIG. 1 with an exception that the serpentine cooling path (conduit) of laser 20 formed by lateral and longitudinal channels drilled through the heat-sink is replaced in laser with a serpentine conduit formed by longitudinal tubes 74, 75, 76, and 77 in corresponding drillings through heat sink 28 connected by lateral tubes 78, 79, and 80 outside of the heat sink.

Referring in particular to FIG. 2B, tubes 74 and 75 are connected by tube 78. Tubes 75 and 76 are connected by tube 79. Tubes 76 and 77 are connected by tube 80. In the arrangement of FIG. 2B, cooling water is fed into tube 74 and flows sequentially through tubes 74, 78, 75, 79, 76, 80 and 77 exiting the conduit from tube 77.

An advantage of this arrangement is that the lateral drilling operations (to create channels 48, 59 and 60) and plug placements of the arrangement of FIG. 1B is avoided. A potential disadvantage is that there must be a close fit of the tubes to the heat-sink to provide adequate thermal conduction between the heat and the longitudinal tubes. This may somewhat complicate assembly of the conduit.

In summary the present invention is described above in terms of a preferred and other embodiments. The invention is not limited however to the embodiments described and depicted herein. Rather, the invention is limited only by the claims appended hereto.

What is claimed is:

1. Laser apparatus, comprising:
an elongated, gas-filled resonator compartment including a laser-resonator unit;
an elongated radio-frequency (RF) power-supply compartment including a RF power-supply for energizing gas in the resonator unit; and
wherein the resonator and power-supply compartments are aligned parallel to each other and spatially separated by an elongated water-cooled heat-sink, and the resonator and power supply units are in thermal communication with the water-cooled heat sink wherein RF power-supply is assembled on a printed circuit board (PCB) and the resonator unit includes a ceramic plate having at least one waveguide-channel in a surface thereof for guiding a lasing mode of the laser, and wherein the PCB and the ceramic plate are in thermal communication with the heat-sink.

2. The apparatus of claim 1, wherein the gas in the resonator unit is a mixture of gases including carbon dioxide.

3. The apparatus of claim 1, wherein the waveguide-channeled surface of the ceramic plate of the resonator-unit faces the heat-sink.

4. Laser apparatus, comprising:
an elongated, gas-filled resonator compartment including a laser-resonator unit;
an elongated radio-frequency (RF) power-supply compartment including a RF power-supply for energizing gas in the resonator unit; and
wherein the resonator and power-supply compartments are aligned parallel to each other and spatially separated by an elongated water-cooled heat-sink, and the resonator and power supply units are in thermal communication with the water-cooled heat sink and wherein the heat-sink includes a serpentine conduit for flowing water through the heat-sink for cooling the heat-sink.

5. The apparatus of claim 4 wherein the serpentine conduit is in a plane in the heat-sink parallel to the power-supply and resonator compartments and closer to the power-supply compartment than to the resonator compartment.

6. The apparatus of claim 4 wherein the distances of the serpentine-conduit plane from the power-supply and resonator compartments are selected such that the laser apparatus is thermo-mechanically neutral.

7. Laser apparatus, comprising:
an elongated, gas filled resonator compartment including a laser-resonator unit;
an elongated radio-frequency (RF) power-supply compartment including a RF power-supply for energizing gas in the resonator unit;
wherein the resonator and power-supply compartments are aligned parallel to each other and spatially separated by an elongated water-cooled heat-sink, and the resonator and power supply units are in thermal communication with the water-cooled heat sink; and wherein the heat-sink includes a serpentine channel for flowing water through the heat-sink for cooling the heat-sink with the serpentine channel in a plane about parallel to the resonator and power-supply compartments and closer to the power supply compartment than to the resonator compartment.

8. The apparatus of claim 7 wherein the distances of the serpentine channel plane from the power-supply and resonator compartments are selected such that the laser apparatus is thermo-mechanically neutral.

9. The apparatus of claim 7, wherein the gas in the resonator unit is a mixture of gases including carbon dioxide.

10. The apparatus of claim 7 wherein RF power-supply is assembled on a printed circuit board (PCB) and the resonator unit includes a ceramic plate having at least one waveguide-channel in a surface thereof for guiding a lasing mode of the laser, and wherein the PCB and the ceramic plate are in thermal communication with the heat-sink.

11. The apparatus of claim 10, wherein the waveguide-channeled surface of the ceramic plate of the resonator-unit faces the heat-sink.

12. The apparatus of claim 7 wherein said serpentine channel includes a plurality of longitudinally extending channels and a plurality of transverse channels providing communication between adjacent longitudinal channels and plugs positioned at various locations in the longitudinal and transverse channels in a manner to direct the flow in serpentine fashion.

13. The apparatus of claim 7 wherein said serpentine channel includes a plurality of longitudinally extending conduits and wherein longitudinal conduits are mounted within the longitudinally channels and wherein said serpentine channel further includes a plurality of transverse conduits for fluidly connecting the longitudinal conduits.

\* \* \* \* \*